United States Patent [19]

Brugge et al.

[11] 3,890,899

[45] June 24, 1975

[54] CARD GAGE FOR DATA RECORDER

[75] Inventors: Walter James Brugge, Highland Heights; Edward Francis Takacs, Willoughby, both of Ohio

[73] Assignee: Addressograph-Multigraph Corporation, Cleveland, Ohio

[22] Filed: Feb. 25, 1974

[21] Appl. No.: 445,799

[52] U.S. Cl. .................. 101/269; 101/369; 101/384

[51] Int. Cl. .................................................. B41f 27/04

[58] Field of Search ........ 101/269, 369, 407 BP, 45, 101/382 R, 383, 384

[56] References Cited

UNITED STATES PATENTS

| | | | |
|---|---|---|---|
| 2,030,865 | 2/1936 | Gollwitzer | 101/369 |
| 2,935,941 | 5/1960 | Bradford | 101/369 |
| 3,413,922 | 12/1968 | Wike | 101/269 |
| 3,596,596 | 8/1971 | Chillingworth | 101/269 |
| 3,707,911 | 1/1972 | Patterson, Jr. | 101/269 |

*Primary Examiner*—J. Reed Fisher
*Attorney, Agent, or Firm*—Harry M. Fleck, Jr.

[57] ABSTRACT

A data recorder apparatus is provided for imprinting data from a plurality of embossed cards and including a card mounting or gage having fingers which extend between adjacent cards to cooperate with the card edges. The gage also includes a plurality of tabs which overhang the recorder bed, with each tab having an inclined ceiling defining a guide for card insertion. Each tab terminates at vertical surface which gages the bottom edge of a card.

13 Claims, 5 Drawing Figures

CARD GAGE FOR DATA RECORDER

BACKGROUND OF THE INVENTION

In the past, various data recorders have been provided which imprint embossed data from cards, such as credit cards, onto sales slips or forms. More recently, it has been proposed that the imprinted information be read by optical character recognition (OCR) equipment to provide data suitable for memory storage and various computer operations. In order to provide reliable OCR reading, it is essential that each imprint be of high quality, absent of blurs or double images. This requires that the embossed data cards be held firmly in place during each imprint operation. It has also been proposed that data recorders be provided with the capability of accommodating a plurality of embossed data cards which would afford a broad selection of variable information. For example, such information could include a Health Insurance card with card holder's identification and policy information on a first card, a treating physician's identification card, and treatment card with information and charges provided on additional cards. This information would be recorded in a single imprint operation.

The versatility of such a data recorder is dependent, to a large extent, upon the ability to easily change the data card selected for imprinting. Also, the cards must be held firmly in place to assure quality imprinting acceptable for OCR reading. Therefore, it is an object of the present invention to provide a novel data recorder gage structure for firmly securing a plurality of embossed data cards in place during imprint operations.

Another object of the present invention is to provide a unique data recorder gage structure for holding one or more embossed data cards firmly in place during imprint and permiting easy removal and changing by the operator.

It is a further object of the present invention to provide a versatile data recorder gage structure which is of economical one-piece molded construction and which is capable of accommodating a plurality of embossed data cards to hold such firmly in place during imprint operations.

SUMMARY

The present invention is generally related to data recorders for imprinting embossed information and, more particularly, to a gage or mounting structure which is capable of accommodating a plurality of embossed data cards which may be conveniently changed by the operator. Preferably, the gage structure is of one-piece molded construction with a plurality of spaced fingers each disposed between adjacent cards and having protrusions which cooperate with notches in the data card edges. The fingers also define vertical gage surfaces which engage the opposite edges of the inserted card. The gage also includes a plurality of tabs, each of which overhangs the data recorder bed and serves both as a card insertion guide and means for retaining the card once it is inserted in place. Preferably, the tabs are resilient in nature and yieldably flex under the influence of a card during insertion or removal. This enhances the ease with which the embossed data cards may be changed.

DESCRIPTION OF THE PREFERRED EMBODIMENT

Figure 1:
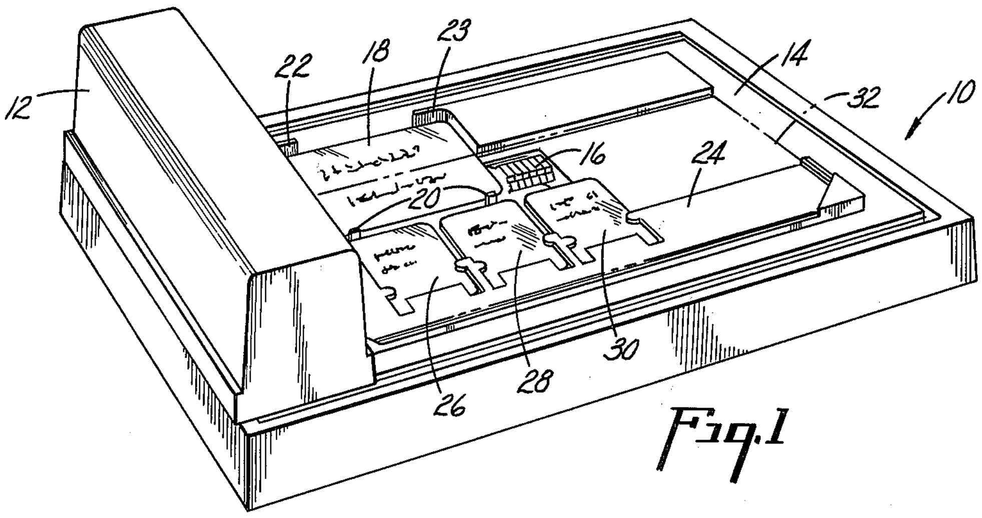
FIG. 1 is a perspective view of a typical data recorder utilizing the gage structure of the present invention.

Referring now, more particularly, to FIG. 1 of the drawings, a typical recorder associated with the present invention is generally indicated by the numeral 10 and includes a platen carriage 12 mounted for reciprocation over a rigid planar, bed 14. The data recorder may include a group of settable date wheels 16 which protrude through an opening in bed 14 to provide imprint of date information on the form together with the other data. A health insurance card 18, or the like, is mounted in a conventional manner by a pair of gage fingers 20 and upper gages 22 and 23. Preferably, the embossed data of card 18 is in general alignment with date wheels 16. This provides imprinting of the embossed card data and date information on the forward stroke of platen carriage 12.

A mounting member or gage 24 is provided which accommodates three embossed data cards 26, 28, and 30. The data which appears on these cards is positioned such that it produces an imprint on a single form on the return stroke of platen carriage 12. Preferably, the platen carriage is of the shiftable roller type, such as that disclosed in U.S. Pat. 3,577,917, issued May 11, 1971 and assigned to the assignee of the present invention. Of course, it is not intended that the shiftable roller platen constitute a part of the present invention. It will also be appreciated that gage 24 may be appropriately modified to accommodate a greater or lesser number of cards without departing from the scope of the present invention.

When utilizing the data recorder for health insurance purposes, one of the cards such as card 26, would provide physician identification data with the other cards, such as cards 28 and 30, providing treatment data and the charges for such treatment. Prior to a typical operation of the data recorder, the doctor's nurse or receptionist inserts the policy holder's identification card 18 and selected data cards 26, 28, and 30. An appropriate form 32 is then inserted in place, as illustrated in phantom in FIG. 1. After the imprint operation, the smaller data cards may be removed and stored in a convenient holder for subsequent retrieval, if needed. If the data recorded is to be utilized in a physicians private office, one of the data cards, for example card 26 or an embossed metal plate bearing similar information, may be mounted permanently in place. It will be appreciated that the successful use of the above-described data recorder requires that the small data cards be readily removable and interchangable for set up prior to each imprint operation. Furthermore, when one of the data cards is mounted, it must be held firmly in place during imprint to assure against blurring and preferably provide an imprint suitable for OCR reading.

Figure 2:
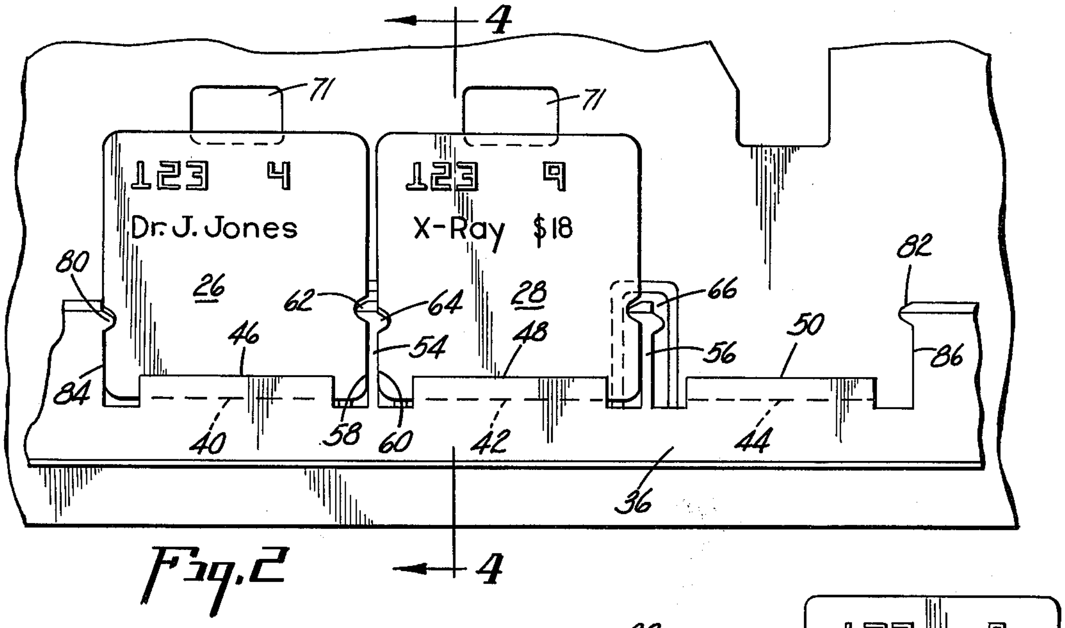
FIG. 2 is a top plan view of the gage structure with sections removed and holding two embossed data cards in position.
Figures 3, 4, 5:
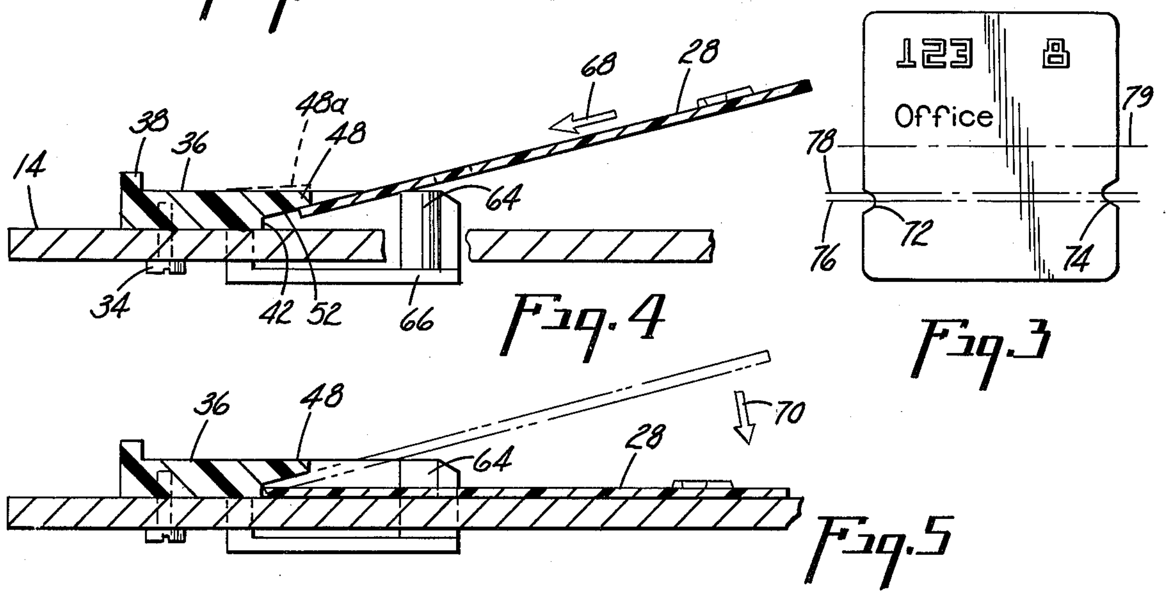
FIG. 3 is a top plan view of a typical embossed data card having notches in opposite edges which cooperate with the gage structure.
FIG. 4 is a sectional view taken along section 4—4 of FIG. 2 but with the data card partially inserted.
FIG. 5 is a sectional view similar to FIG. 4 with the data card fully in place.

Mounting of the data cards is achieved by gage member 24, the structural details of which are best illustrated in FIGS. 2, 4 and 5. (Preferably, the gage member is of one-piece molded plastic construction and mounted to bed 14 by way of bolts 34, or other appropriate fastening means.) The gage member is comprised of an elongated main body portion 36 which engages the upper planar surfaces of bed 14 and is oriented in a direction generally parallel to the path of travel of platen carriage 12. The main body may be provided with a rim or ridge 38 which serves as a mounting gage for the imprint forms, such as illustrated in FIG. 1. A plurality of vertical wall surfaces 40, 42 and 44 associated with main body 36 define bottom edge gages, each of which cooperates with the bottom edge of an inserted card, as best illustrated in FIG. 5. A group of tabs 46, 48 and 50 are integral with the main body, extend outwardly therefrom and overhang gage surfaces 40, 42 and 44 respectively. Each tab includes an inclined ceiling surface 52 which defines a guide for each card during insertion, as hereinafter explained. Preferably, each of the tabs is of relatively thin construction and with the opposite ends being free to allow a degree of flexing, as exaggerated in dashline at 48*a* in FIG. 4. This flexing in an upward direction by the card aids in removal of the card in that it provides additional clearance between the card edges and the protrusion gages.

The gage member is also provided with a pair of elongated fingers 54 and 56 which extend laterally outward from main body 36. Each finger includes a pair of oppositely disposed side wall surfaces 58 and 60, defining side gages which cooperate with the edges of inserted cards, as best illustrated in FIG. 2. In addition, each finger is provided with a pair of protrusions 62 and 64 of a particular size and configuration to cooperate with similarly shaped notches formed in opposite edges of each of the data cards. It will be appreciated that each of the gage fingers 54 and 56 defines gage surfaces which cooperate with a pair of data cards, whereby a single finger performs a dual function. Preferably, each finger includes a horizontal reenforcement web 66 which is disposed beneath the bed surface within the area of an opening or hole formed in the bed. This web strengthens the finger, and at the same time allows some flexing which may occur under the influence of the platen roller.

The guide surfaces 52 associated with each tab are inclined upwardly and outwardly from the main body in the same direction as fingers 54 and 56. Each card is inserted in a manner illustrated in FIGS. 4 and 5. The card is oriented at an angle and articulated in the direction indicated by arrow 68 in FIG. 4, such that the card may slide on the corners of protrusion gages 62 and 64 with the card remaining generally parallel to guide surface 52. When the bottom edge of the card engages vertical gage surface 42, there is sufficient clearance between the card notches and protrusions to allow the card to be pivoted in a downward direction as indicated by arrow 70 in FIG. 5 into flush engagement with the surface of bed 14. Once the card is in this position, it is held firmly in place against movement under the influence of the roller platen during the imprint operation. The protrusion gages hold the card against movement away from the bottom gage surface 42, while the side and bottom gages prevent lateral shifting or twisting of the card by the roller platen. Removal of the cards is enhanced by finger holes or openings 71 formed in bed 14. These permit the data recorder operator to insert his finger tip under the top edge of a card and raise such upward for easy removal.

Referring particularly to FIG. 2, it will be observed that the right and left card mounting positions are provided with protrusions 80 and 82 which are located to cooperate with corresponding notches on the data cards. Preferably, the main body of gage 24 is widened in these areas to provide these protrusions and also define side gage surfaces 84 and 86. The larger surface of the gage member adjacent surface 84 and 86 also provides support for the imprint form.

With particular reference to FIG. 3, the configuration of a typical embossed data card may be seen in more detail. Each card is formed from plastic and is provided with a pair of notches 72 and 74 which cooperate with protrusion gages 62 and 64, as explained above. The notches are slightly larger than their corresponding protrusions to allow sufficient clearance for card mounting. Preferably, the notches are offset from each other slightly as indicated by center lines 76 and 78. The notches are also spaced from the horizontal center line 79 of the card. This assures that the data cards cannot be inserted upside down or in an otherwise improper orientation.

From the foregoing description, it will be appreciated that the gage structure of the present invention is capable of accommodating a plurality of embossed data cards, yet is of relatively simple one-piece construction. Furthermore, the construction of the gage permits easy insertion and removal of the data cards and at the same time is capable of holding the cards firmly in place during each imprint operation. It will be appreciated that tabs 46, 48 and 50 are integral with main body 36 but are of relatively thin construction which provides a degree of resiliency and flexing to accommodate easy insertion and removal of the cards. Of course, it is not intended that the above-described card gage be limited to the exact configuration or one-piece construction illustrated in the drawings. If desired, the gage could be manufactured in more than one piece and of materials other than plastics.

While the invention has been particularly shown and described with reference to several embodiments, it will be understood by those skilled in the art that various changes in form and detail may be made without departing from the spirit and scope of the invention.

What is claimed is:

1. In a data recorder apparatus for imprinting data from a plurality of generally rectangular embossed information cards disposed on a rigid bed, a mounting for holding the cards securely in place during imprint, said mounting comprising:

an elongated main body of generally planar configuration mounted to the data recorder bed, a plurality of gage fingers longitudinally spaced along the length of said main body and integral therewith, each of said fingers extending laterally outward from said main body and generally disposed in the plane thereof, each of said fingers including a pair of oppositely facing surfaces generally perpendicular to the recorder bed and defining side gages, the side gages on adjacent fingers being spaced apart a distance approximately equal to the width of a card for engagement with the side edges of the card, a plurality of elongated wall surfaces longitudinally spaced along the length of said main body, each being perpendicular to said side gages and the data recorder bed and defining a bottom gage adapted to engage the bottom edge of a card, each of said fingers includes a distal end portion spaced from said main body, each distal end portion including a pair of protrusions extending in opposite directions laterally from said side gages of the associated finger, said protrusions defining retaining gage surfaces which cooperate with notches in the side edges of the cards to prevent their movement away from said bottom gage, and a plurality of tab portions integral with said main body, each of said tab portions extending laterally outward from said main body in the same general direction as said fingers and overhanging one of said bottom gages to retain the bottom edge of an inserted card, said protrusions being spaced from said main body by a distance greater than the distance said tab portions extend outwardly from said main body, whereby the bottom edge of a card may be inserted under said tab portion and the notches brought down over said protrusions when mounting the card.

2. The mounting set forth in claim 1 wherein said protrusions of each pair are spaced from said main body by different distances corresponding to the spacing of the card notches from the bottom edge, whereby the card may not be inserted in up-side-down orientation.

3. The mounting set forth in claim 1 wherein each of said tabs includes a generally planar lower surface spaced from the data recorder bed and defining guides for the cards during insertion.

4. The mounting set forth in claim 3 wherein said lower surface is inclined upwardly and outwardly from said main body in the general direction which said fingers extend from said main body.

5. In combination, a data recorder and at least one removable card bearing embossed information, said data recorder comprising:

a rigid bed with a substantially planar surface, a platen carriage mounted for selective reciprocation along a path of travel over said bed, and a card mounting attached to said bed to secure said card firmly in place during reciprocation of said platen carriage, said card mounting comprising:

an elongated body mounted to said bed and including a first gage surface extending above and substantially perpendicular to said bed surface and generally parallel to the path of carriage travel, a pair of gage members extending laterally from the integral with said elongated main body including second and third gage surfaces extending above and substantially perpendicular to said bed surface and to said first gage surface, said gage members including oppositely disposed protrusions extending outward from said second and third surface toward each other, opposite edges of said card each including at least one notch which is engaged by one of said protrusions when the card is mounted on said bed, said first gage surface engaging a bottom edge of said card when mounted and resting on said bed with said second and third gage surfaces engaging the opposite side edges of said card and said notches cooperating with said protrusions and retentatively engaging said card to prevent its movement in the plane defined by said bed, and a tab extending outwardly from said body above said first gage surface, said tab overhanging said surface and said card when mounted, each said protrusion being spaced from said main body by a distance greater than the distance said tab extends outwardly from said main body, whereby the bottom edge of said card may be inserted under said tab and said notches brought down over said protrusions to mount said card.

6. The combination set forth in claim 5 wherein said protrusions are spaced from said main body by different distances corresponding to the spacing of said card notches from said bottom edge, whereby said card may not be inserted in up-side-down orientation.

7. The combination set forth in claim 5 wherein said mounting member is of one-piece molded construction.

8. The combination set forth in claim 5 wherein said tab includes a generally planar lower guide surface terminating at said first page surface and inclined at an angle to said bed surface, said guide surface being engagable by said card during insertion to guide such into said first gage surface.

9. The combination set forth in claim 8 wherein said protrusions are of a height slightly greater than said inclined guide surface and engage portions of said card whereby said card assumes an orientation generally parallel to said guide surface during insertion.

10. The combination set forth in claim 9 wherein said mounting member is one-piece molded construction.

11. The combination set forth in claim 8 wherein said tab is made of somewhat flexible material for yieldable flexing upward under the influence of said card during removal.

12. The combination set forth in claim 11 wherein said tab is integral with said main body.

13. The combination set forth in claim 12 wherein said mounting is of one-piece construction.

* * * * *